United States Patent [19]

Riggle et al.

[11] Patent Number: 5,016,131
[45] Date of Patent: May 14, 1991

[54] INTEGRAL BALANCED-MOMENT HEAD POSITIONER

[75] Inventors: Charles M. Riggle; Peter R. Svendsen, both of Colorado Springs; John D. Read, Monument, all of Colo.

[73] Assignee: Digital Equipment Corporation, Maynard, Mass.

[21] Appl. No.: 343,907

[22] Filed: Apr. 26, 1989

[51] Int. Cl.[5] ............................................. G11B 5/55
[52] U.S. Cl. .................................. 360/106; 360/78.12; 360/98.01
[58] Field of Search ................... 360/106, 78.01, 78.04, 360/98.01, 78.12; 310/36, 12, 13, 27, 40 R

[56] References Cited

U.S. PATENT DOCUMENTS

| | | | |
|---|---|---|---|
| 4,346,416 | 8/1982 | Riggle et al. | 360/106 |
| 4,620,252 | 10/1986 | Bauck et al. | 360/106 |
| 4,622,516 | 11/1966 | Hearn et al. | 360/106 X |
| 4,796,122 | 1/1989 | Levy et al. | 360/106 X |
| 4,835,643 | 5/1989 | Schulze | 360/106 |
| 4,870,703 | 9/1989 | Augeri et al. | 360/106 X |
| 4,916,342 | 4/1990 | Hirano et al. | 360/106 X |

Primary Examiner—Robert S. Tupper
Assistant Examiner—Andrew L. Sniezek
Attorney, Agent, or Firm—Cesari & McKenna

[57] ABSTRACT

A balance-moment head positioner includes a rotor assembly which rotates about a central shaft. The rotor assembly supports at the same axial location a current-carrying coil, arms for the heads, and a counterweight such that the positioner is dynamically balanced with its center of gravity at the center of rotation. The coils are arranged with legs parallel to the central shaft on diametrically opposite sides of the assembly. In addition, the positioner includes magnets and an elongated U-shaped magnetic pole member with ends facing the coils at the same axial location at the arms. Thus the torque developed when current flows through the coil, and a reactive counter-torque developed by the rotating mass coincide, substantially eliminating all torsion in the shaft, and there is no net force on the shaft.

6 Claims, 6 Drawing Sheets

INTEGRAL BALANCED-MOMENT HEAD POSITIONER

FIELD OF INVENTION

The invention relates to the field of digital mass storage systems, and in particular to disk drive read/write head rotational positioners.

BACKGROUND OF THE INVENTION

A disk drive used as a mass storage device in a digital data processing system typically includes multiple magnetic disks stacked on a single spindle. Data signals, which are stored on the magnetic disks as patterns of magnetic flux reversals, are recorded ("written") on the disks by means of read/write heads, that is, magnetic transducers. The data signals are written in concentric circular paths, or tracks, on one or both surfaces of all disks. Thereafter, read/write heads are used to retrieve ("read") the data signals recorded on the disks.

Each read/write head is associated with a surface, or portion of a surface, of a particular disk. The read/write heads, which are in close proximity to the various disk surfaces or tracks, are positioned laterally with respect to the disks by a head positioner. When the disk drive is to read or write data at a particular disk location, the head positioner positions the appropriate read/write head over the indicated disk location or track. The faster the head positioner positions the read/write head over the desired disk location, the faster the data can be transferred to or from the disk.

In a typical disk drive, a single positioner controls the positions of the various read/write heads associated with an entire stack of disks. The heads are attached to "rigid" support arms which in turn are attached to a rotor. The rotor rotates the support arms, and therefore the heads, about a spindle which is oriented parallel to the disk spindle. It thereby moves the heads laterally over the disk surface, moving each head to the same, (or approximately the same), relative position, that is, the same track, on the associated disk. This set of tracks is often referred to as a cylinder.

The invention pertains to rotational head positioners and, in particular, to "voice-coil driven"0 rotational positioners. To control the movement of the rotor, a voice-coil-driven rotational positioner utilizes the magnetic field associated with a current-carrying coil and a permanent magnet. The rotational direction of the rotor is governed by the direction of the current flow through the current-carrying coil. When the positioner is to move the heads to a particular disk location, current is passed through the coil in the appropriate direction, and a torque is developed in proportion to the current flowing in the coil and the magnetic flux density created by the permanent magnet in the coil region. As a result of the torque, the rotor is rotated, moving the heads.

Rapid acceleration and deceleration of the rotor, required for rapid positioning of the heads, cause reactive forces to develop in the rotor and the support arms. These reactive forces can interfere with the accurate positioning of the heads, particularly if they excite mechanical resonances in these structures.

One type of prior positioner essentially comprises a rotor with the support arms extending radially therefrom, and a rotational actuator, including the coil and the magnet, attached to one end of the rotor. The reactive torques of the rotor and arms induce torsion in the actuator shaft, and this adversely affects the rapid, accurate positioning of the read/write heads.

The torsion problem is largely eliminated in another type of rotary actuator, in which the actuator is integrated with the rotor to which the arms are attached. These actuators usually exert lateral forces on the rotational bearings that support the system. Thus the bearings must have high radial stiffness to counteract the lateral forces and prevent lateral movement of the rotor.

The high radial stiffness of the bearings, which are in contact with the rotor, is achieved by applying a high axial load to the bearings resulting in relatively large frictional torque which must be overcome before a stationary rotor may rotate. To overcome the frictional torque a torque is applied to the rotor. Thus there is a period when a torque is applied to the rotor and there is no corresponding rotor movement. This period is often referred to as a "dead band". Once the bearings/rotor frictional torque is overcome, the torque then being applied causes the rotor to rapidly rotate. Thus the applied torque and the rotor movement during and immediately after the dead band period are not proportional, often leading to read/write head positioning errors.

SUMMARY OF INVENTION

The invention is an improved coil-driven, balanced torque rotational positioner. The motor, or actuator, controlling the rotation is integrated with a stationary central shaft and a rotating outer shell and head support arm assembly. Counterweights on the outer shell opposite the support arms dynamically balance the system, thereby substantially eliminating the lateral forces on the rotational bearings. The integrated assembly also supports the current-carrying coil such that the actuator, the support arms and the associated counterweights have a composite center of gravity at the center of rotation. Moreover, the coil is positioned in the same axial location as the support arms. Thus the actuator torque and the inertial counter-torque coincide and the torsion in the shaft is therefore substantially eliminated.

Briefly, the positioner includes an axially elongated, U-shaped magnetic pole member having pole faces that confront the rotating outer shell at diametrically opposed positions, thereby providing a magnetic path from one pole face, through the shell and central shaft to the other pole face, and back through the pole member to the first pole face. One or more permanent: magnets in the magnetic path provide a magnetic flux.

When a current is passed through the coil it reacts with the flux and a torque develops which rotates the coil-supporting outer shell, and the arms and counterweights integral therewith, around the central shaft. The rotating system is dynamically balanced, and the torque and the resulting counter-torque develop at the same axial location. Thus both the reactive forces and torsion within the system are substantially minimized.

DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION

Figure 1:
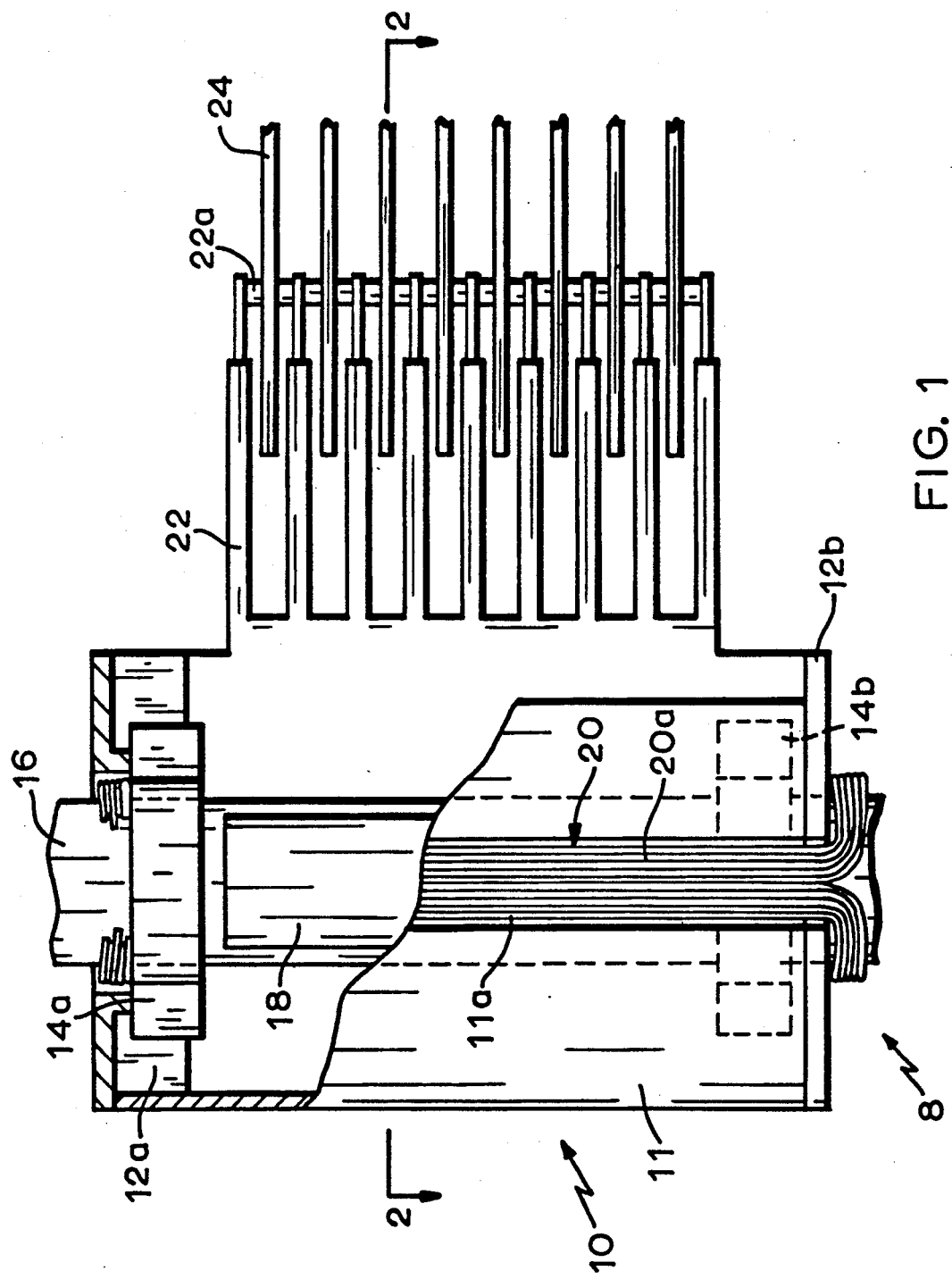
FIG. 1 is a fragmentary side view, partially broken away, of a rotational positioner constructed in accordance with the invention.

As shown in FIG. 1 a rotational positioner 8 includes a rotor assembly 10, which, in turn, includes an outer shell 11 and integral support arms 22. Attached to the ends of the support arms 22 are read/write heads 22a. Each read/write head 22a is associated with a particular surface of one of a plurality of magnetic disks 24. Each support arm 22 may contain one or more read/write heads 22a for accessing single or multiple bands of data written on the magnetic disks 24. The support arms 22 may be separable from and attachable to the outer shell 11, becoming an integral part of the shell 11 when attached to it. Having separable support arms 22 may slightly reduce the stiffness of the assembly 10.

The rotor assembly 10 undergoes limited rotation around a central shaft 16. The shaft 16, which is made of magnetic permeable material, is aligned in parallel with a spindle (not shown) about which the disks 24 rotate. The rotor assembly 10 has endcaps 12a and 12b that support the outer shell 11 on the shaft 16 by means of bearings 14a and 14b. The endcaps 12a and 12b may contain a conventional arrangement for pre-loading the bearings.

The rotation of the rotor assembly 10 is controlled by two elongated permanent magnets 17 and 18 attached to the shaft 16 (shown in more detail in FIG. 2) and a current carrying coil 20 embedded in the outer shell 11, as discussed with reference to FIG. 2 below. The permanent magnets 17 and 18 are oriented longitudinally, that is, parallel to the axis of rotation, as shown through the cut-away in FIG. 1.

Figure 2:
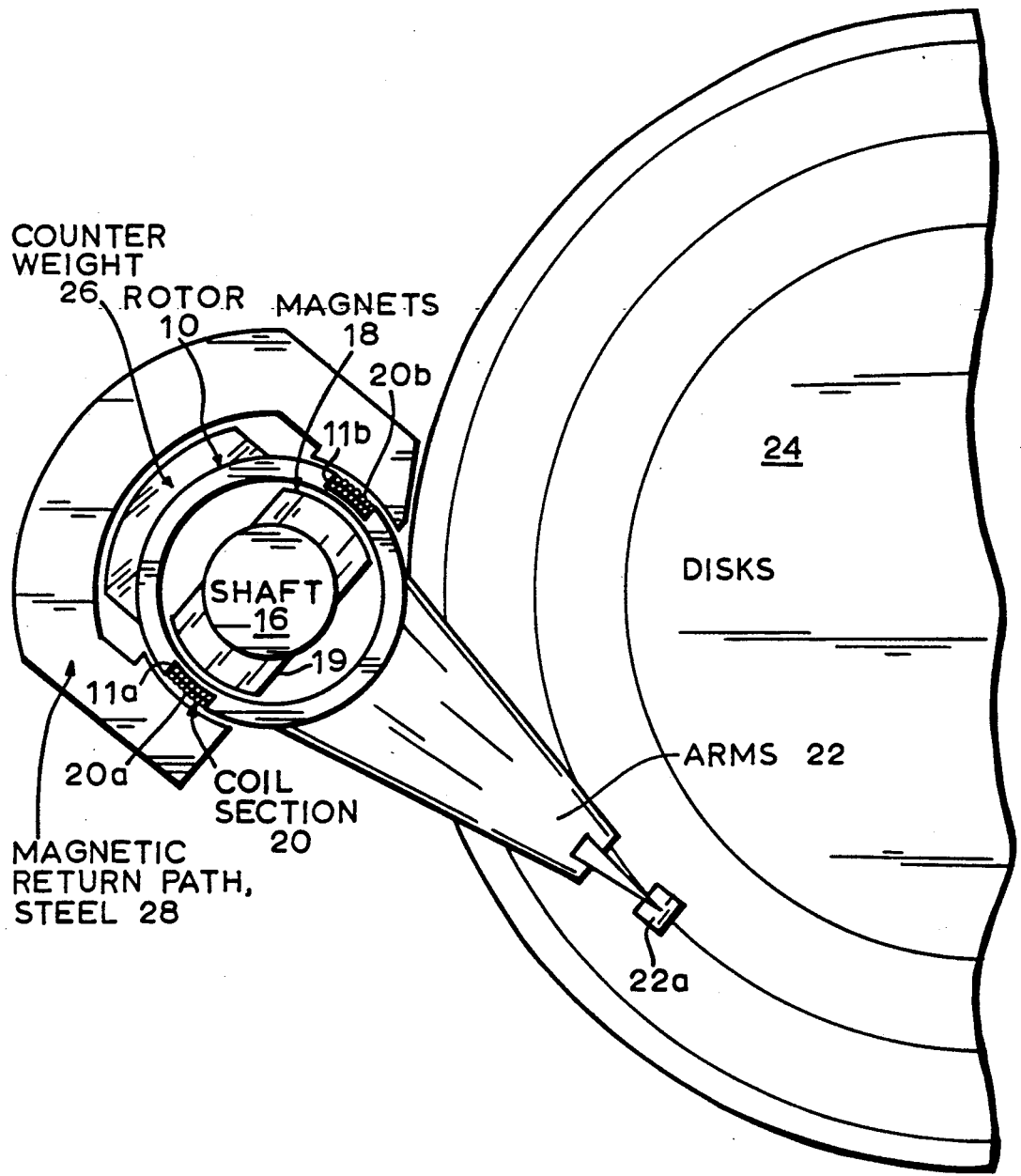
FIG. 2 is an illustration of a cross-section of the positioner shown in FIG. 1, sectioned along line 2—2 of FIG. 1.

As shown in FIG. 2 the rotor assembly 10 is surrounded on three sides by a U-shaped magnetic pole member 28. The magnetic pole member 28 has diametrically opposed pole faces 28a and 28b and carries the magnetic flux of the magnets 17 and 18 from one pole face, for example, face 28a, around the U-shaped path and back to the pole face 28b. The central shaft 16 then completes the magnetic circuit for the flux.

The coil 20 extends around the rotor assembly 10, with longitudinal legs 20a and 20b embedded in diametrically opposed slots 11a and 11b in the outer shell 11. Each of the pole faces 28a and 28b confronts one of these legs. When a current is applied to the coil 20, it interacts with the radial flux of the permanent magnets 17 and 18, creating a torque which rotates the rotor assembly 10. The torque and the reactive counter-torque from the rotating mass are distributed over the same axial location, that is, they coincide, essentially eliminating reactive forces and torsion in the shaft.

A counterweight 26 on the rotor assembly 10, opposite the support arms 22, dynamically counterbalances the weight of the support arms 22 and the attached heads 22a. Additionally, the composite center of gravity of the actuator, the support arms and the counterweight is at the center of rotation of the assembly, substantially eliminating lateral forces in the rotational bearings 14a and 14b.

Figure 3:
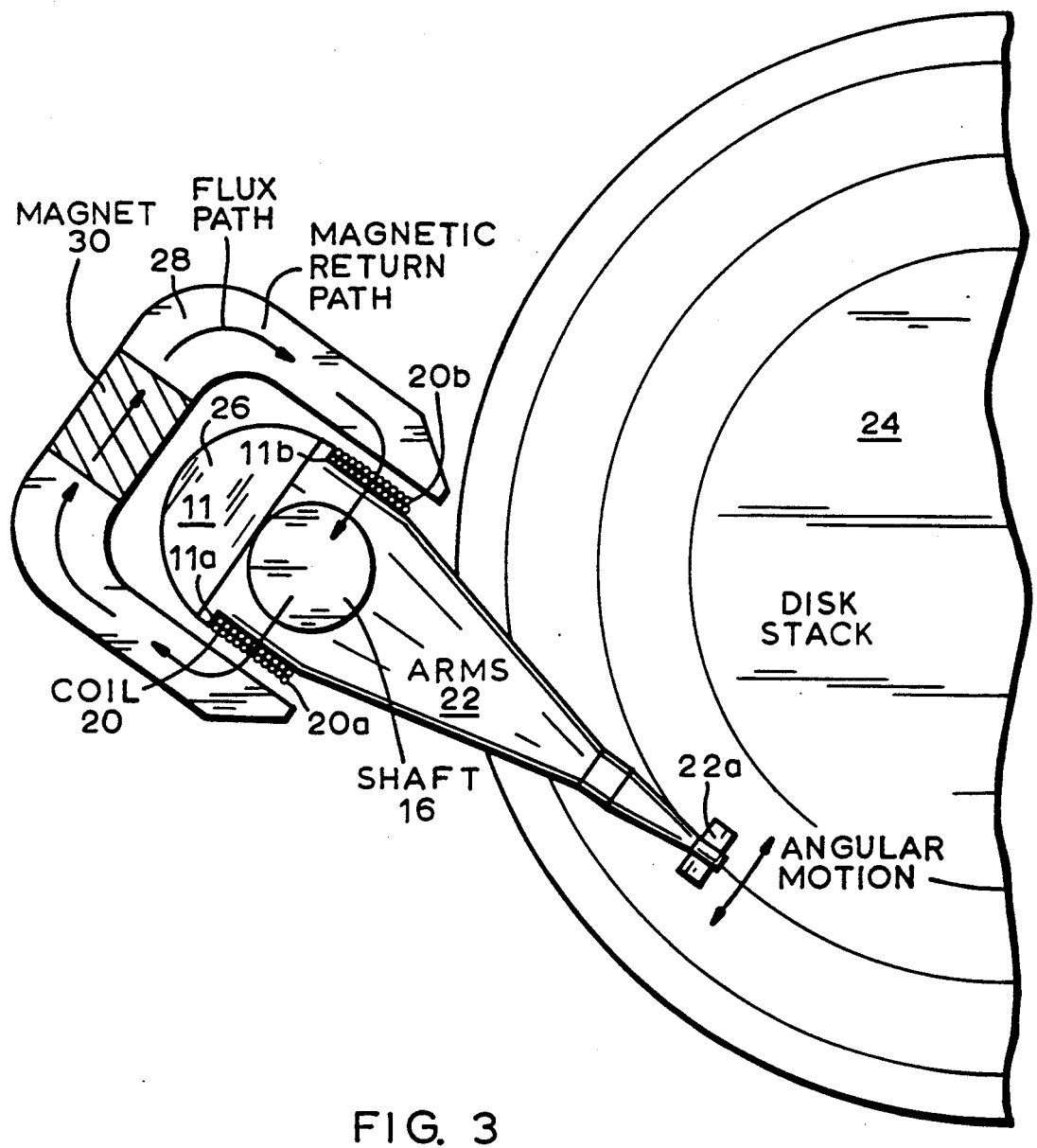
FIG. 3 is an illustration of a cross-sectional view of a second embodiment of the invention.

A second embodiment of the invention, illustrated in FIG. 3, is similar to the first embodiment, except for the placement of the permanent magnet. A permanent magnet 30 is embedded in the U-shaped magnetic pole member 28. This arrangement tends to provide better isolation of the magnetic disks 24 from the magnetic flux in the actuator.

Figure 4:
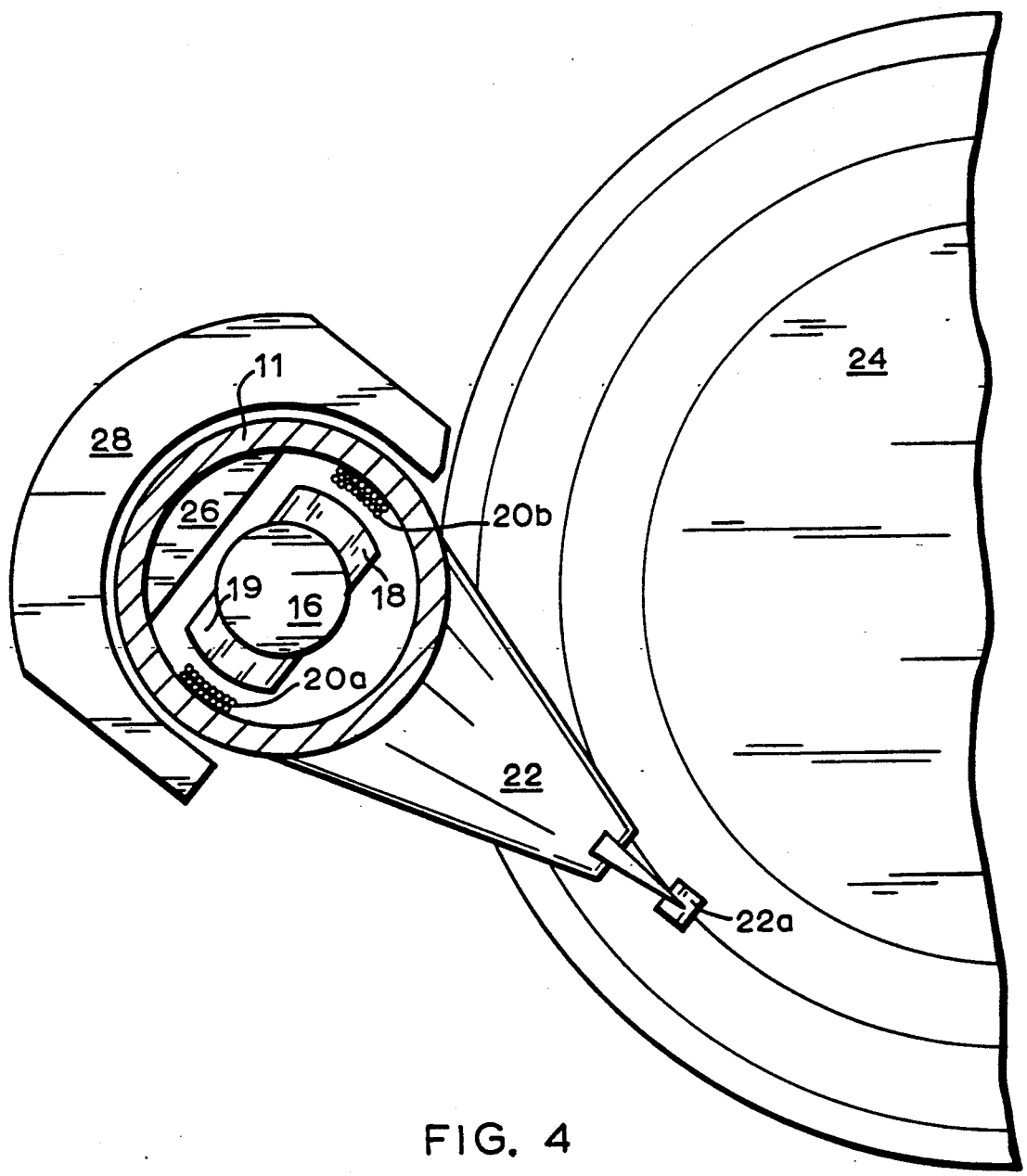
FIG. 4 is an illustration of a cross-sectional view of a third embodiment of the invention.

A third embodiment of the invention is illustrated in FIG. 4. This embodiment is also similar to the first embodiment, except for the placement of the coil. The coil 20 is wound longitudinally inside the outer shell 11, as opposed to outside the shell 11 as shown in FIG. 1. Thus the flux density close to the pole faces 28a and 28b is relatively high, resulting in an increased motor torque constant for a given magnetomotive force from the magnets 17 and 18.

The embodiment shown in FIG. 4 also has the counterweight 26 inside the outer shell 11. The actuator, like the actuator 10 shown in FIG. 2, is statically and dynamically balanced with its center of gravity coinciding with its center of rotation. Thus placing the counterweight 26 inside or outside of the outer shell 11 depends on ease of manufacture and/or assembly.

Figure 5:
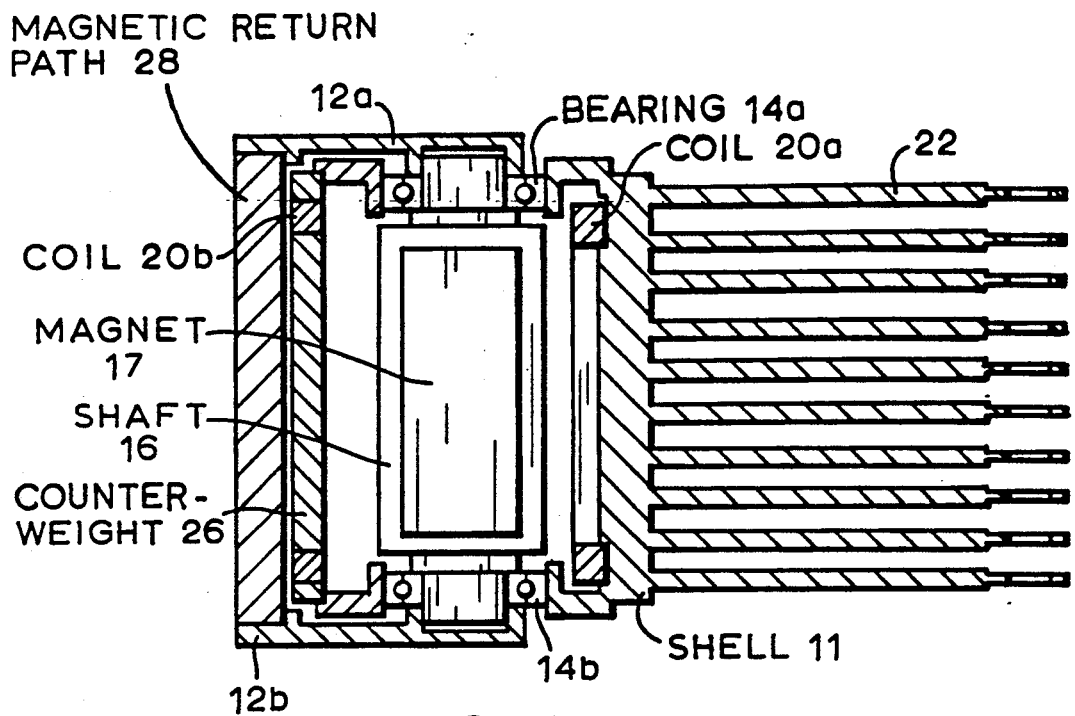
FIG. 5 is a fragmentary side view, partially broken away, of a fourth embodiment of the invention.

A fourth embodiment is shown in FIG. 5. In this embodiment the coil 20 is split into two coils 20a and 20b and placed one on either side of the shaft 16. The coils are mounted on the inside of the outer shell 11, as discussed in more detail below with reference to FIG. 7. Configuring the coil such that the coil return paths are around the shaft 16 rather than over the top of the assembly allows a reduction in the axial height of the actuator.

A single magnet 18 is located in a recess in the center of the shaft 16. The magnet 18 may be larger in both radial and axial dimensions than the magnet in a one coil actuator of similar height because space for a coil return path is not required. The larger magnet provides the actuator with a higher torque constant and increased gap field strength.

Figure 6:
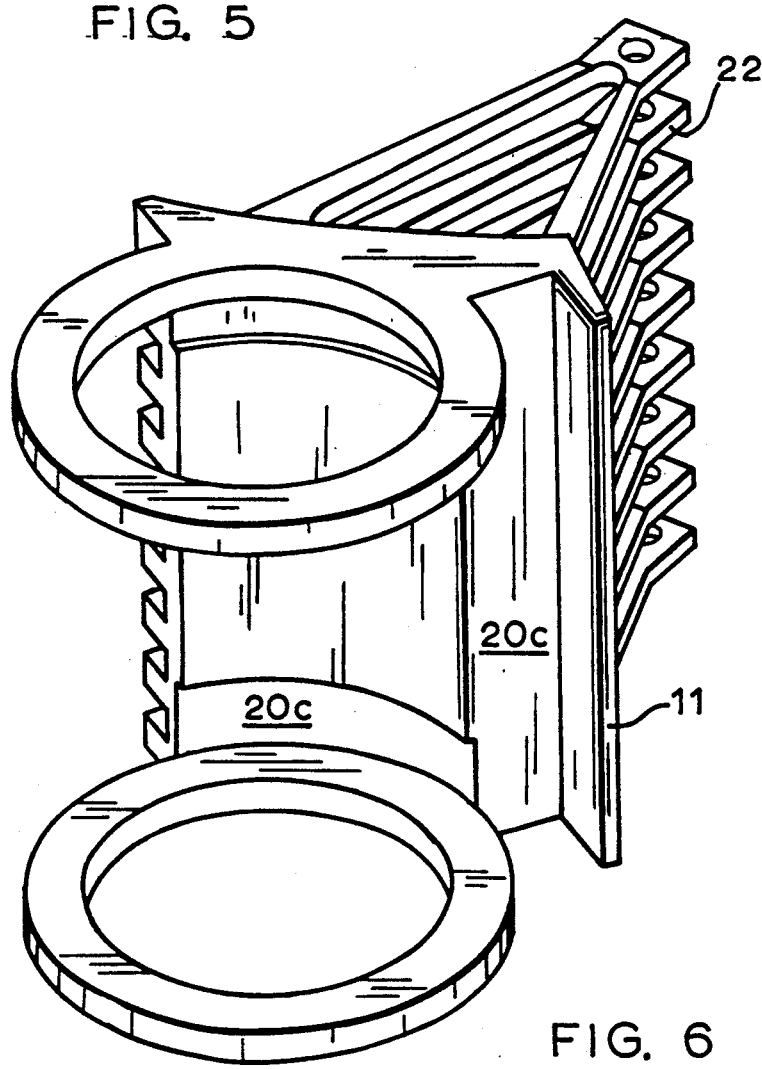
FIG. 6 is a rear view of a rotor shown in FIG. 5.

FIG. 6 is a rear view of the outer shell 11 of the actuator 8 shown in FIG. 5. The outer shell 11 includes integral support arms 22 and recessed coil return slots 20c. The coil return slots 20c are shown in more detail in FIG. 7. The back-side of the outer shell 11, opposite the support arms 22, is open to facilitate insertion of the coils 20a and 20b and the counterweight 26 (FIG. 5).

Figure 7:
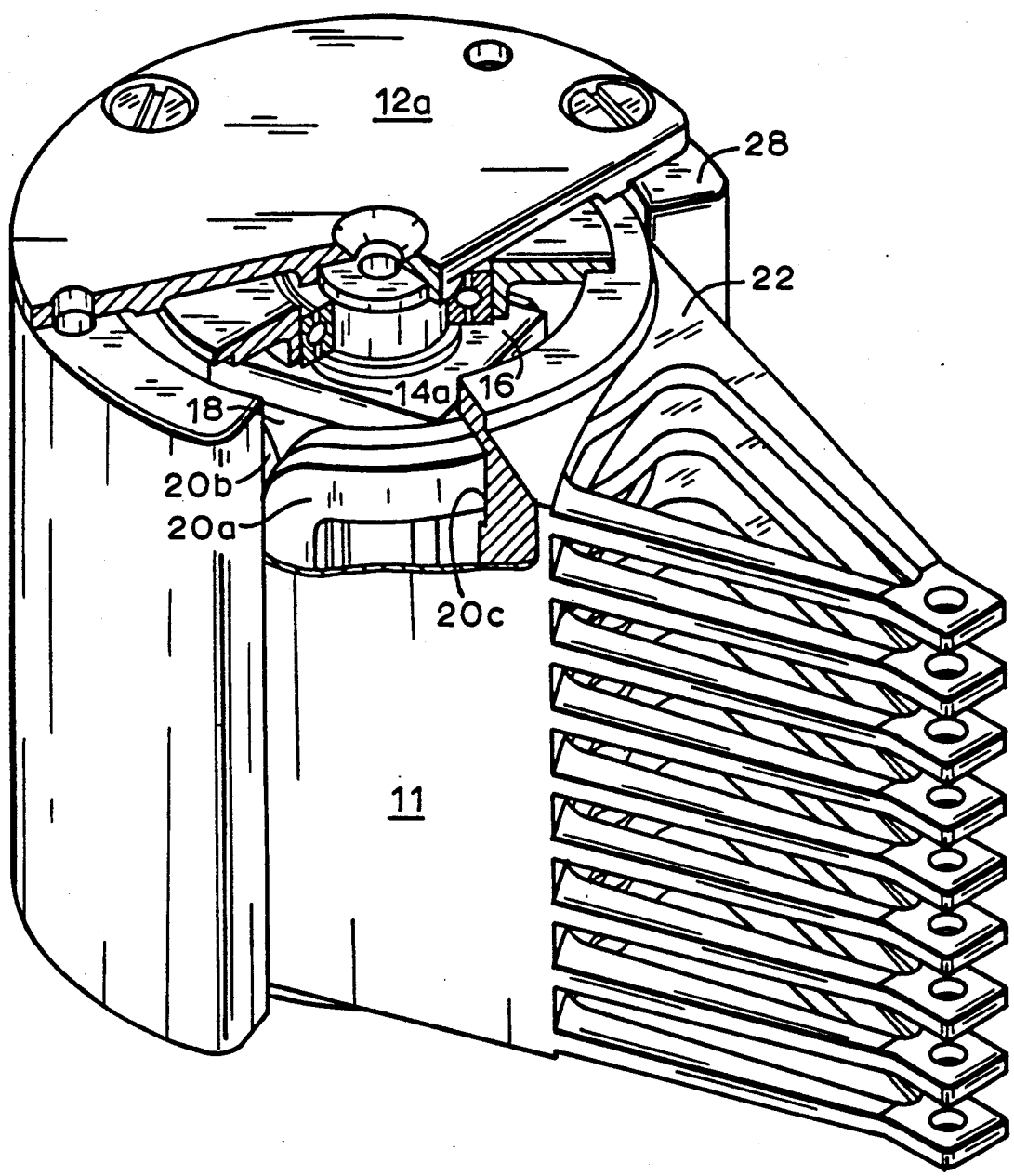
FIG. 7 is a fragmentary top view of an actuator shown in FIG. 4.

FIG. 7 is a fragmentary top view, partially broken away, of the actuator 8 shown in FIG. 5. This view shows in more detail the coil 20a set in recessed coil return path slot 20c.

Each of the embodiments may contain crash stops and motor flex leads, both of which are known in the art. One example of such crash stops is shown in commonly-assigned U.S. Pat. No. 4,346,416 to Riggle, et al.

The actuating torque, and the support arms 22 and counterweight 26 counter-torque are distributed over the same axial location, that is, they coincide, substantially eliminating torsional resonances from the system. Dynamically balancing the rotating mass and the counterweights on the outer shell 11 such that their composite center of gravity is at the center of rotation of rotor assembly 10 substantially eliminates lateral forces on the rotational bearings 14a and 14b. Thus the bearings 14a and 14b may have less radial stiffness than in previous systems, reducing the frictional torque, and the positioning error associated therewith.

The foregoing description has been limited to four specific embodiments of this invention. It will be apparent, however, that variations and modifications may be made to the invention with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A rotational positioner for positioning read/write heads across a plurality of magnetic disks, said positioner comprised of:
   A. a rotor assembly mounted for rotation about a central axis said rotor assembly including
      i. a rotor;
      ii. a plurality of arms carried on said rotor within a predetermined axial location of said axis for supporting the read/write heads;
      iii. a coil mounted on said rotor with a pair of legs extending parallel to the axis each of which is positioned diametrically opposite the other with respect to the axis, said coil legs being at the same axial location as said arms; and
      iv. a counterweight disposed on said rotor opposite said arms such that the center of gravity of said rotor assembly is on the axis, said counterweight dynamically balancing said rotor; and
   B. means for passing a magnetic flux radially through said coil legs such that a torque developed in response to current through said coil and a reactive counter-torque developed in response to the rotating rotor assembly are at the same axial location and there is no net force on the axis.

2. The positioner of claim 1, wherein said means for passing a magnetic flux includes:
   A. an elongated U-shaped magnetic pole member which fits around said rotor assembly and confronts said rotor assembly with two diametrically opposed pole faces, with each pole face confronting one of said coil legs; and
   B. at least one permanent magnet positioned such that said magnetic pole member carries the flux from said magnet through one of said pole faces around the U-shaped path and back tot he second of said pole faces.

3. The position of claim 2, wherein said arms are integral with said rotor.

4. A rotational positioner for positioning read/write heads across a plurality of magnetic disks, said positioner comprised of:
   A. a rotor assembly mounted for rotation about a central axis said rotor assembly including:
      i. a rotor;
      ii. a plurality of arms carried on said rotor within a predetermined axial location of said axis; said coils being parallel to the axis and diametrically opposite each other with respect to the axis, said coils further being at the same axial location as said arms; and
      iv. a counterweight disposed on said rotor opposite said arms such that the center of gravity of said rotor assembly is on the axis, said counterweight dynamically balancing said rotor; and
   B. means for passing a magnetic flux through said coils such that a torque developed in response to current through said coils and a reactive counter-torque developed in response to the rotating rotor assembly are at the same axial location and there is no net force on the axis.

5. The positioner of claim 4, wherein said means for passing a magnetic flux includes:
   A. an elongated U-shaped magnetic pole member which fits around said rotor assembly and confronts said rotor assembly with two diametrically opposed pole faces, with each pole face confronting a portion of each of said coils; and
   B. at least one permanent magnet positioned such that said magnetic pole member carries the flux from said magnet through one of said pole faces around the U-shaped path and back tot he second of said pole faces.

6. The positioner of claim 5, wherein said rotor rotates about a hollow central shaft, said shaft surrounding said permanent magnet.

* * * * *

UNITED STATES PATENT AND TRADEMARK OFFICE
CERTIFICATE OF CORRECTION

PATENT NO. : 5,016,131

DATED : May 14, 1991

INVENTOR(S) : Charles M. Riggle, et al

It is certified that error appears in the above-identified patent and that said Letters Patent is hereby corrected as shown below:

Column 6, line 16, after the word axis delete "; said coils being"

insert --for supporting the read/write heads;

iii. a plurality of coils mounted on said rotor, said coils having portions extending--

Column 6, line 16, after the word and insert -- said coils being--.

Column 6, line 4, delete "tot he" should read --to the--.

Signed and Sealed this

First Day of December, 1992

Attest:

DOUGLAS B. COMER

Attesting Officer

Acting Commissioner of Patents and Trademarks